(12) United States Patent
Zhang et al.

(10) Patent No.: US 9,916,448 B1
(45) Date of Patent: Mar. 13, 2018

(54) DETECTION OF MALICIOUS MOBILE APPS

(71) Applicant: Trend Micro Incorporated, Tokyo (JP)

(72) Inventors: Zhibo Zhang, Nanjing (CN); Liang Sun, Nanjing (CN); Longping Wu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 122 days.

(21) Appl. No.: 15/003,562

(22) Filed: Jan. 21, 2016

(51) Int. Cl.
*G06F 21/56* (2013.01)
*G06F 17/30* (2006.01)
*G06F 21/57* (2013.01)

(52) U.S. Cl.
CPC ...... *G06F 21/562* (2013.01); *G06F 17/30327* (2013.01); *G06F 21/56* (2013.01); *G06F 21/564* (2013.01); *G06F 21/577* (2013.01); *G06F 2221/033* (2013.01)

(58) Field of Classification Search
CPC ...... G06F 21/56; G06F 21/562; G06F 21/564; G06F 21/577; G06F 2221/033
See application file for complete search history.

(56) References Cited

U.S. PATENT DOCUMENTS

| 1,261,167 | A | 4/1918 | Russell | |
|---|---|---|---|---|
| 7,058,822 | B2 * | 6/2006 | Edery | G06F 21/52 726/22 |
| 7,725,735 | B2 * | 5/2010 | Fox | G06F 21/563 713/187 |
| 8,418,249 | B1 * | 4/2013 | Nucci | G06F 21/552 706/20 |
| 8,756,432 | B1 | 6/2014 | Chen | |
| 8,806,641 | B1 | 8/2014 | Li | |
| 9,092,615 | B1 | 7/2015 | Mao | |
| 9,268,668 | B1 * | 2/2016 | Lachwani | G06F 11/3664 |

(Continued)

FOREIGN PATENT DOCUMENTS

WO WO 2016009356 * 1/2016 ............. G06F 21/57

OTHER PUBLICATIONS

M. Karami, M. Elsabagh, P. Najafiborazjani and A. Stavrou, "Behavioral Analysis of Android Applications Using Automated Instrumentation," 2013 IEEE Seventh International Conference on Software Security and Reliability Companion, Gaithersburg, MD, 2013, pp. 182-187.*

(Continued)

*Primary Examiner* — Kari Schmidt
(74) *Attorney, Agent, or Firm* — Okamoto & Benedicto LLP

(57) ABSTRACT

Software development kit (SDK) class tree structures of malicious SDKs are created, with each node of the SDK class tree structures representing a class of a corresponding malicious SDK. An app class tree structure of a mobile app is also created, with each node of the app class tree structure representing a class of the mobile app. To determine if the mobile app has been created (e.g., repackaged or originally created) using at least one of the malicious SDKs, the app class tree structure is compared against the SDK class tree structures to find an SDK class tree structure that matches the app class tree structure. For confirmation, the similarity of classes of the app class tree structure relative to classes of the SDK class tree structure can be determined.

12 Claims, 8 Drawing Sheets

(56) References Cited

U.S. PATENT DOCUMENTS

| | | | |
|---|---|---|---|
| 9,313,219 B1 | 4/2016 | Zhang et al. | |
| 9,672,357 B2* | 6/2017 | Alme | G06F 21/563 |
| 9,773,114 B2* | 9/2017 | Park | G06F 21/562 |
| 2004/0261021 A1 | 12/2004 | Mitta et al. | |
| 2006/0241933 A1 | 10/2006 | Franz | |
| 2012/0019674 A1 | 1/2012 | Ohnishi et al. | |
| 2012/0072991 A1* | 3/2012 | Belani | H04W 4/001 |
| | | | 726/25 |
| 2012/0214416 A1 | 8/2012 | Kent et al. | |
| 2013/0097706 A1* | 4/2013 | Titonis | G06F 21/56 |
| | | | 726/24 |
| 2013/0232540 A1* | 9/2013 | Saidi | G06F 21/6218 |
| | | | 726/1 |
| 2013/0281206 A1 | 10/2013 | Lyons et al. | |
| 2013/0281207 A1 | 10/2013 | Lyons et al. | |
| 2013/0291123 A1 | 10/2013 | Rajkumar et al. | |
| 2013/0307784 A1 | 11/2013 | Matsuzawa et al. | |
| 2014/0006032 A1 | 1/2014 | Korn | |
| 2014/0082729 A1* | 3/2014 | Shim | G06F 21/51 |
| | | | 726/23 |
| 2014/0113683 A1 | 4/2014 | Hickey | |
| 2014/0181973 A1* | 6/2014 | Lee | G06F 21/562 |
| | | | 726/23 |
| 2014/0245448 A1 | 8/2014 | Moon et al. | |
| 2014/0248929 A1 | 9/2014 | Noonan et al. | |
| 2015/0213365 A1* | 7/2015 | Ideses | H04L 63/14 |
| | | | 706/12 |
| 2015/0220514 A1 | 8/2015 | Zhang | |
| 2016/0021174 A1* | 1/2016 | De Los Santos Vilchez | H04L 43/10 |
| | | | 709/201 |
| 2016/0044049 A1* | 2/2016 | Xing | H04L 63/14 |
| | | | 726/23 |
| 2017/0161498 A1* | 6/2017 | Yavo | G06F 21/566 |
| 2017/0185785 A1* | 6/2017 | Vorona | G06F 21/577 |

OTHER PUBLICATIONS

Sun, Mengtao, and Gang Tan. "Nativeguard: Protecting android applications from third-party native libraries." Proceedings of the 2014 ACM conference on Security and privacy in wireless & mobile networks. ACM, 2014, pp. 165-176.*

M. Alazab, V. Moonsamy, L. Batten, P. Lantz and R. Tian, "Analysis of malicious and benign android applications," 2012 32nd International Conference on Distributed Computing Systems Workshops, Macau, 2012, pp. 608-616.*

Soundex—Wikipedia, the free encyclopedia, 4 sheets [retrieved on Aug. 19, 2014], retrieved from the internet: http://en.wikipedia.org/wiki/Soundex.

Edit distance—Wikipedia, the free encyclopedia, 5 sheets [retrieved on Aug. 19, 2014], retrieved from the internet: http://en.wikipedia.org/wiki/Edit_distance.

* cited by examiner

```
▼ ⊞ dd.sdk
  ▷ ⊞ a
  ▽ ⊞ activitys
      ▷ 📄 DdPayActivity.class
      ▷ 📄 a.class
      ▷ 📄 b.class
      ▷ 📄 c.class
  ▷ ⊞ b.a
  ▷ ⊞ c
  ▷ ⊞ d
  ▷ ⊞ e.a
  ▷ ⊞ f.a
  ▷ ⊞ g
  ▷ ⊞ pay
  ▷ ⊞ service
```

FIG. 4
(PRIOR ART)

| SDK Name | Package Name | Score |
|---|---|---|
| PUA:Waps | b/a/d | 0.902291 |
| PUA:Waps | cn/waps | 0.935304 |
| PUA:Waps | com/ktgame/wap | 0.95122 |
| PUA:Waps | com/lfwx | 0.881036 |
| PUA:Waps | com/lfwx/tool | 0.871786 |
| PUA:Waps | com/lovinggame/game/star | 1 |
| PUA:Waps | com/lxwh/xuanping | 0.95122 |
| PUA:Waps | com/mobi | 0.955942 |
| PUA:Waps | com/trustyapp/base/wp | 0.895654 |
| PUA:Waps | igudi/com/ergushi | 0.881036 |
| ...... | ...... | ...... |

FIG. 8

| AV-Test Vol. | 1519 | 1510 | 1501 | 1436 | 1419 |
|---|---|---|---|---|---|
| Sample Count | 45 | 30 | 60 | 25 | 33 |
| Detection Count | 42 | 27 | 56 | 23 | 33 |
| Detection Rate | 93.3% | 90.0% | 93.3% | 92.0% | 100.0% |

FIG. 9

DETECTION OF MALICIOUS MOBILE APPS

BACKGROUND OF THE INVENTION

1. Field of the Invention

The present invention relates generally to computer security, and more particularly but not exclusively to methods and apparatus for detecting malicious mobile application programs.

2. Description of the Background Art

Mobile computing devices run mobile operating systems, which are designed to be suitable for computers that are constrained in terms of memory and processor speed. An application program for a mobile operating system is commonly referred to as a "mobile app" or simply as an "app." A mobile app may be created using a software development kit (SDK), which may include development tools, libraries, application programming interfaces, classes, and other components that enable a programmer to create the mobile app. A mobile app created using an SDK includes instructions, such as classes, of the SDK.

The ANDROID operating system is an example of a mobile operating system that runs on mobile computing devices. Mobile apps for the ANDROID operating system come in a file referred to as the ANDROID application package (APK) file. The ANDROID APK file is an archive file that includes a plurality of files, including files of classes needed by the mobile app to execute.

A programmer may create (e.g., repackage or originally create) an ANDROID mobile app using an SDK from the vendor of the ANDROID operating system, which currently is GOOGLE Inc. An ANDROID mobile app may also be created using a third-party (i.e., not from GOOGLE Inc.) SDK. This poses a security risk because some third-party SDKs are malicious. More particularly, a legitimate (i.e., non-malicious, safe) ANDROID mobile app may be repackaged using a malicious SDK, resulting in classes and/or other instructions from the malicious SDK being included in the repackaged ANDROID mobile app.

SUMMARY

In one embodiment, software development kit (SDK) class tree structures of malicious SDKs are created, with each node of the SDK class tree structures representing a class of a corresponding malicious SDK. An app class tree structure of a mobile app is also created, with each node of the app class tree structure representing a class of the mobile app. To determine if the mobile app has been created (e.g., repackaged or originally created) using at least one of the malicious SDKs, the app class tree structure is compared against the SDK class tree structures to find an SDK class tree structure that matches the app class tree structure. For confirmation, the similarity of classes of the app class tree structure relative to classes of the SDK class tree structure can be determined.

These and other features of the present invention will be readily apparent to persons of ordinary skill in the art upon reading the entirety of this disclosure, which includes the accompanying drawings and claims.

DESCRIPTION OF THE DRAWINGS

FIG. 4 shows a directory structure of an example malicious SDK.

FIG. 8 shows example outputs of a malicious mobile app detector in accordance with an embodiment of the present invention.

FIG. 9 shows results of tests in which embodiments of the present invention were employed to detect malicious mobile apps.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
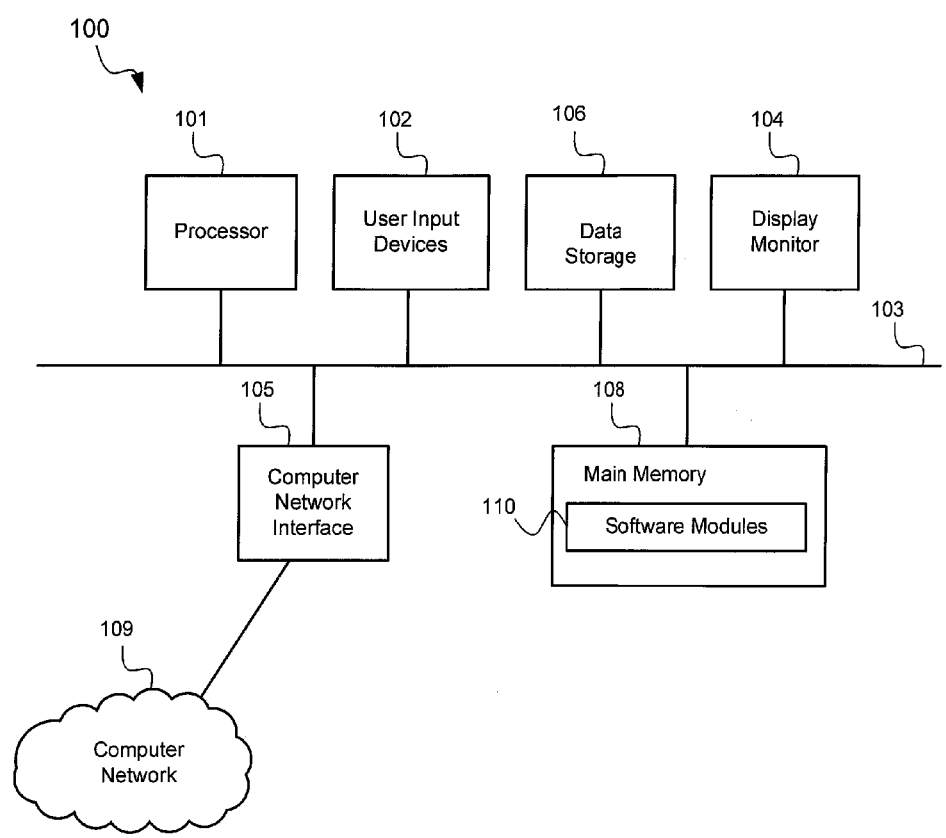
FIG. 1 shows a schematic diagram of a computer system that may be employed with embodiments of the present invention.

Referring now to FIG. 1, there is shown a schematic diagram of a computer system 100 that may be employed with embodiments of the present invention. The computer system 100 may be employed as a malicious mobile app detector, for example. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with software modules 110. The software modules 110 comprise instructions stored non-transitory in the main memory 108 for execution by the processor 101. When the computer system 100 is configured as a malicious mobile app detector, the software modules 110 may comprise instructions for detecting malicious mobile apps that were created using a malicious SDK. The software modules 110 may be loaded from the data storage device 106 to the main memory 108. An article of manufacture may be embodied as computer-readable storage medium including instructions that when executed by the computer system 100 causes the computer system 100 to be operable to perform the functions of the software modules 110.

Malicious mobile apps are typically legitimate mobile apps that have been repackaged to include malicious instructions. Malicious mobile apps may be detected by package name matching, which involves matching the package name of a mobile app against package names of known malicious mobile apps. Because of the large number of mobile apps currently available, package name matching is prone to false alarms (i.e., classifying a legitimate mobile app as malicious) and false negatives (i.e., classifying a malicious mobile app as legitimate).

Malicious mobile apps may also be detected using a program dependence graph (PDG), which as its name implies shows the dependency of a program. The PDG of a mobile app may be compared against malicious PDGs to determine if the mobile app is malicious. However, building and processing PDGs take time and consume a lot of computing resources. This discourages usage of PDGs in production environments that receive a constant stream of mobile apps to be evaluated.

Figure 2:
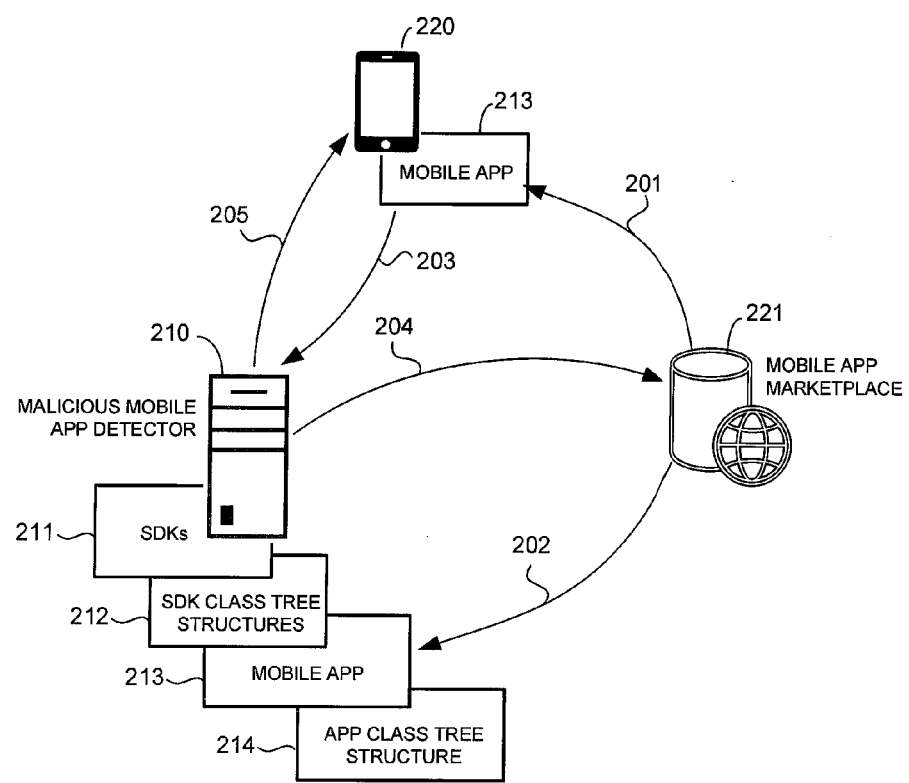
FIG. 2 shows a malicious mobile app detector in accordance with an embodiment of the present invention.

FIG. 2 shows a malicious mobile app detector 210 ("detector 210") in accordance with an embodiment of the present invention. In the example of FIG. 2, the detector 210 is embodied as a system comprising one or more computers that are in communication with one or more mobile computing devices 220, one or more mobile app marketplaces 221, and/or other computing devices over the Internet and/or other computer network.

A mobile computing device 220 may be a smartphone, tablet, or other mobile computing device that runs a mobile operating system. In the following embodiments, a mobile computing device 220 may be an ANDROID smartphone or tablet, i.e., a mobile computing device that runs the ANDROID operating system. A mobile computing device 220 may download a mobile app 213 from a mobile app marketplace 221 (see arrow 201). A mobile app marketplace 221 may comprise one or more computers that host ANDROID mobile apps for online purchase. The mobile app marketplace 221 may be an official mobile app marketplace, e.g., GOOGLE PLAY marketplace. The mobile app marketplace 221 may also be a third-party mobile app marketplace.

The mobile app 213 may or may not be malicious. The mobile app 213 may be legitimate and free of malicious code or may be infected with malicious code. More specifically, the mobile app 213 may be a once legitimate mobile app that has been repackaged by a cybercriminal using a malicious SDK, making the mobile app 213 malicious. The risk of the mobile app 213 being malicious is even greater when the mobile app 213 is obtained from a third-party mobile app marketplace over the Internet. To determine whether or not the mobile app 213 is malicious, the mobile app 213 may be received in the detector 210 for evaluation. The detector 210 may receive the mobile app 213 from the mobile app marketplace 221 (see arrow 202), the mobile computing device 220 (see arrow 203), or some other computing device over the Internet and/or other computer network.

The detector 210 may comprise one or more computers that are configured to detect malicious mobile apps. In one embodiment, the detector 210 maintains a plurality of known malicious SDKs 211 and creates a class tree structure 212 for each malicious SDK 211. Accordingly, the detector 210 may create a plurality of SDK class tree structures 212.

The term "class" is used herein in the context of object-oriented programming in general and the ANDROID operating system in particular. As is well-known, a class is an extensible program-code-template for creating objects. In one embodiment, each node of an SDK class tree structure 212 represents a class of the corresponding malicious SDK 211, with each node indicating the features of the class and other information. In one embodiment, the class features indicated in each node of an SDK class tree structure 212 comprise relevant class features, which are class features that cannot be obfuscated, usually because doing so would prevent the mobile app from properly executing. Examples of these relevant class features that cannot be obfuscated include the derived-from class (e.g., base class or super class), framework application programming interfaces (APIs), string tokens, access flag of the class, particular numeric class features ("DirectMethodNum", "VirtualMethodNum", "StaticFieldNum", "InstanceFieldNum", "AccessFlag"), etc.

In one embodiment, the detector 210 creates a mobile app class tree structure 214 from a mobile app 213 that is being evaluated. An app class tree structure 214 is similar to an SDK class tree structure 212, except that an app class tree structure 214 represents classes of a mobile app 213 whereas an SDK class tree structure 212 represents classes of a malicious SDK 211. The class tree structures 212 and 214 may thus be created in the same manner.

The detector 210 may compare an app class tree structure 214 against the SDK class tree structures 212 to determine if the app class tree structure 214 is likely to be malicious (i.e., likely to be of a malicious mobile app). In one embodiment, the detector 210 performs tree-structure matching to compare the app class tree structure 214 to the SDK class tree structures 212, and deems the app class tree structure 214 to be likely malicious when the app class tree structure 214 matches an SDK class tree structure 212. To confirm that the app class tree structure 214 is malicious, the detector 210 may perform weighted similarity matching of the classes of the app class tree structure 214 against the corresponding classes of the matching SDK class tree structure 212. The detector 210 may classify a mobile app 213 as malicious when the mobile app 213 has an app class tree structure 214 that matches an SDK class tree structure 212 and has classes that are similar to that of the SDK class tree structure 212. In that case, the mobile app 213 is likely to have been originally created or repackaged using the malicious SDK 211 from which the matching SDK class tree structure 212 was created.

The detector 210 may perform a security action upon detecting a malicious mobile app 213. For example, the detector 210 may so inform the mobile app marketplace 221 to initiate removal of the mobile app 213 from the marketplace (see arrow 204). The detector 210 may also so inform the mobile computing device 220 (see arrow 205), or perform other security actions.

Figure 3:
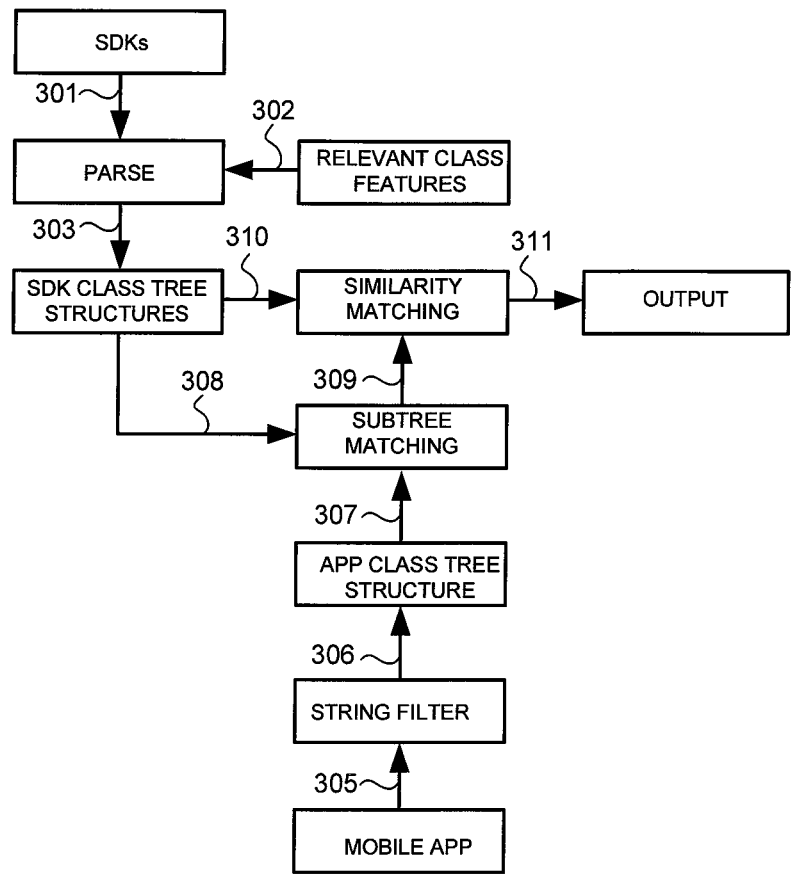
FIG. 3 shows a flow diagram of a method of detecting a malicious a mobile app in accordance with an embodiment of the present invention.

FIG. 3 shows a flow diagram of a method of detecting a malicious a mobile app in accordance with an embodiment of the present invention. The method of FIG. 3 may be performed by the malicious mobile app detector 210. The method of FIG. 3 may also be performed using other components without detracting from the merits of the present invention. The method of FIG. 3 is explained in conjunction with FIGS. 4-8.

In the example of FIG. 3, the detector 210 parses malicious SDKs (arrow 301) to identify and extract classes and relevant class features of the classes (arrow 302) from the malicious SDKs. In one embodiment, the relevant class features are those that cannot be obfuscated without compromising the operation of a mobile app. The detector 210 creates SDK class tree structures for the malicious SDKs, with each node of an SDK class tree structure representing a class of a malicious SDK and indicating relevant class features of the class (arrow 303). This results in a plurality of SDK class tree structures that may be used for comparison against an app class tree structure of a mobile app being evaluated.

FIG. 4 shows a directory structure of an example malicious SDK. As shown in FIG. 4, a malicious SDK (and SDKs in general) includes files of classes that are included in mobile apps. That is, a mobile app created using the malicious SDK may include one or more of the malicious SDK's classes. The detector 210 may parse a malicious SDK to extract classes and relevant class features of the classes, build an SDK class tree structure having the classes as nodes of the tree structure, and indicate the relevant class features in corresponding nodes.

Figure 5:
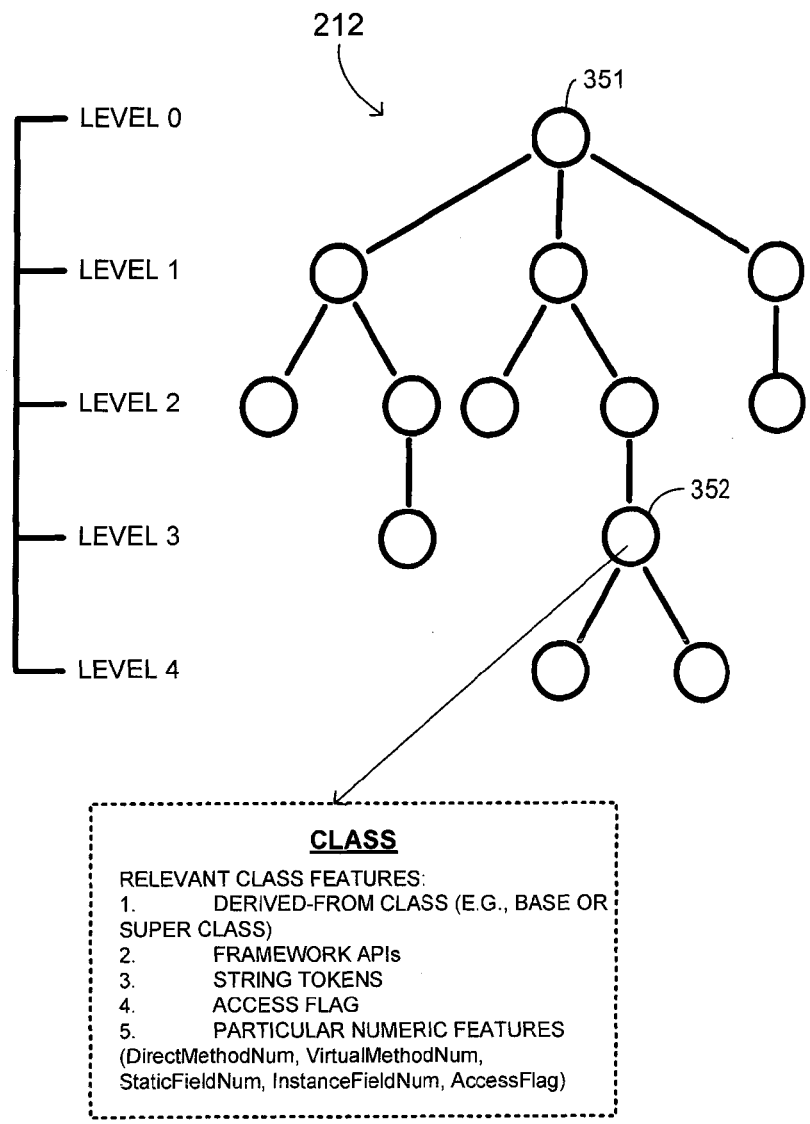
FIG. 5 shows an example SDK class tree structure created from a malicious SDK in accordance with an embodiment of the present invention.

FIG. 5 shows an example SDK class tree structure 212 created from a malicious SDK (e.g., SDK of FIG. 4) in accordance with an embodiment of the present invention. An SDK class tree structure includes a plurality of nodes (depicted as circles in FIG. 5), with each node representing a class of the malicious SDK and includes relevant class features of the class. Being a tree structure, the SDK class tree structure has several levels that represent the hierarchical structure of classes of the malicious SDK. The SDK class tree structure has a root node on the top level (i.e., Level 0), and child nodes under the root node. The root node (labeled as 351) represents a derived-from class, such as a base class or a super class. A child node in the SDK class tree structure represents a child class that is derived from the derived-from class. For illustration purposes, a child node 352 is labeled in FIG. 5 to show example relevant class features that may be indicated in a node. The detector 210 may generate a plurality of SDK class tree structures, one for each known malicious SDK. Advantageously, being a tree structure as opposed to a graph, an SDK class tree structure has a relatively simple top-to-bottom hierarchical structure, does not have a cycle (i.e., does not have a node that loops back), and is not too demanding on computing resources to process.

Referring back to the example of FIG. 3, the detector 210 receives a mobile app to be evaluated and passes the mobile app through a string filter (arrow 305) to determine if the mobile app is suspicious and thus warrants further evaluation for malware. The string filter may employ a suitable string-matching algorithm (e.g., regular expressions) to scan the mobile app for one or more strings that are indicative of malicious mobile apps. For example, the string filter may scan the mobile app for presence of the string "fsAd.htmlContent", which is typically found in malicious mobile apps. In one embodiment, for performance reasons, the detector 210 only evaluates mobile apps that are suspicious. In that embodiment, the method of FIG. 3 ends when the mobile app does not include strings that are indicative of malicious mobile apps.

When the result of the string filtering indicates that the mobile app is suspicious, the detector 210 creates an app class tree structure of the mobile app. To facilitate comparison, the app class tree structure may be created in the same manner as the SDK class tree structures. Just like an SDK class tree structure, a node of the app class tree structure represents a class of the mobile app and indicates relevant class features of the class.

The detector 210 compares the app class tree structure to the SDK class tree structures (arrows 307 and 308) to determine if the app class tree structure matches an SDK class tree structure. The tree structure matching may be performed using only the classes of the tree structures, i.e., not considering the relevant class features. As will be more apparent below, the relevant class features of classes of the app tree structure and of a matching SDK class tree structure may be subsequently compared by weighted similarity matching.

Figure 6:
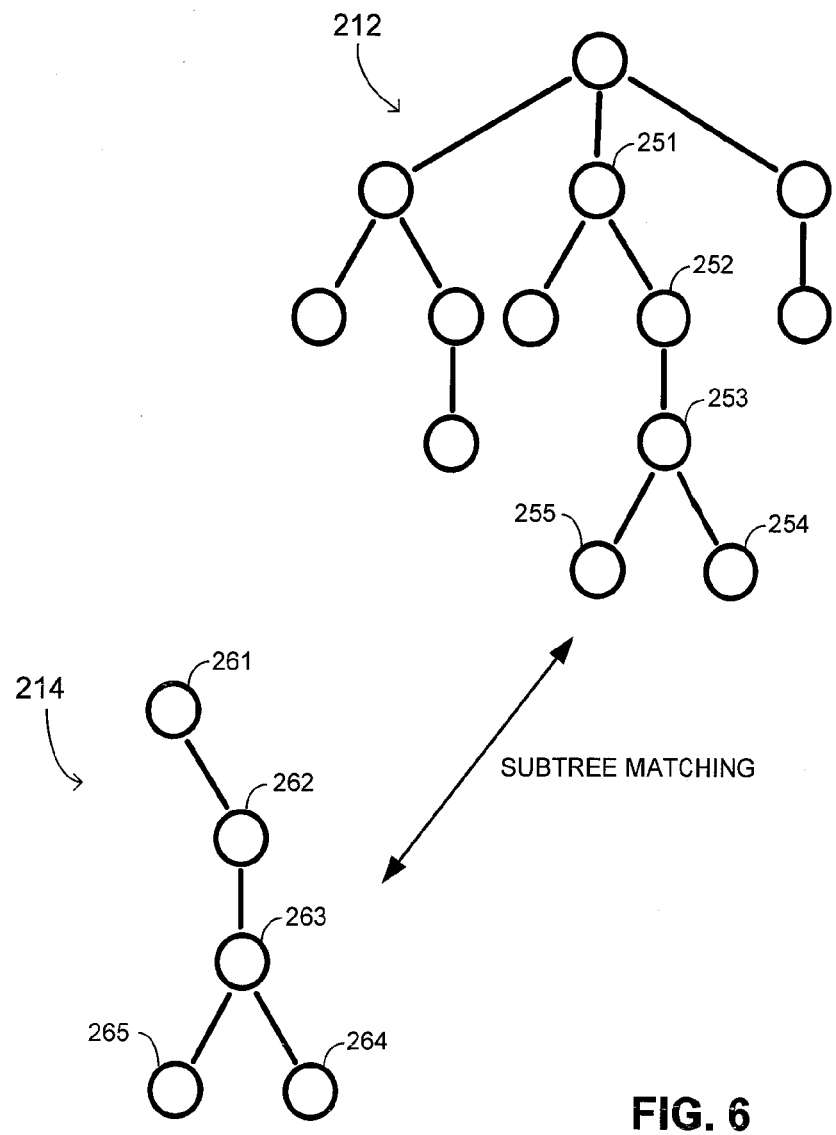
FIG. 6 shows an app class tree structure being compared to an SDK class tree structure, in accordance with an embodiment of the present invention.

The detector 210 may employ a suitable tree-structure matching algorithm, such as tree edit distance, to compare the app class tree structure against the SDK class tree structures. In one embodiment, an app class tree structure matches an SDK class tree structure if at least a subtree of the app class tree structure matches at least a subtree of the SDK class tree structure. The length of a subtree that qualifies as a match may be varied and optimized. FIG. 6 shows an app class tree structure 214 being compared to an SDK class tree structure 212, in accordance with an embodiment of the present invention. In the example of FIG. 6, the app class tree structure 214 has a subtree with nodes 261-265 that match a subtree of the SDK class tree structure 212 comprising nodes 251-255. More particularly, the classes represented by the nodes 261-265 are the same as the classes represented by the nodes 251-255, respectively. In the example of FIG. 6, the app class tree structure 214 is deemed to match the SDK class tree structure 212.

An app class tree structure that matches an SDK class tree structure is likely to have been created using the malicious SDK from which the SDK class tree structure was created. Therefore, when an app class tree structure matches an SDK class tree structure of a malicious SDK, the app class tree structure (and the mobile app from which the app class tree structure was made) is likely to be malicious. However, to minimize false alarms, the detector 210 may perform weighted similarity matching to determine the similarity of the classes of the app class tree structure relative to the classes of the matching SDK class tree structure based on relevant class features (arrows 309 and 310).

Figure 7:
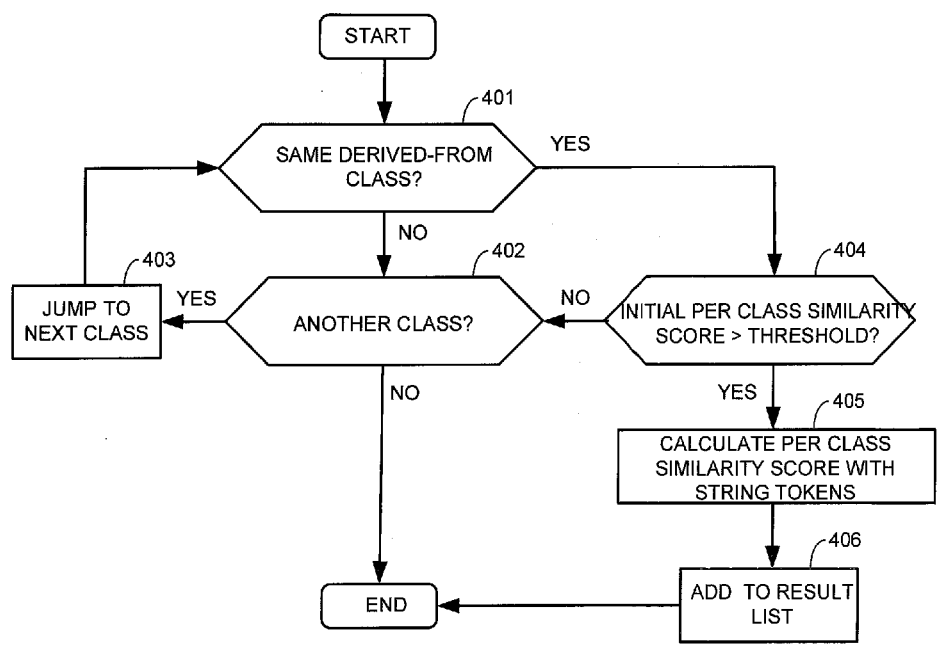
FIG. 7 shows a flow diagram of a method of determining similarity of a class represented by a node of an app class tree structure relative to a class represented by a node of an SDK class tree structure, in accordance with an embodiment of the present invention.

FIG. 7 is a flow diagram of a method of determining similarity of a class represented by a node of an app class tree structure relative to a class represented by a node of an SDK class tree structure, in accordance with an embodiment of the present invention. In one embodiment, the method of FIG. 7 is performed on a per node basis to compare a node of a class tree structure to a corresponding node of a matching SDK class tree structure. The method of FIG. 7 may be performed to obtain a class similarity score, which indicates how similar a class represented by a node of an app class tree structure is to a class represented by a corresponding node of a matching SDK class tree structure. Using the app class tree structure 214 and the SDK class tree structure 212 of FIG. 6 as an example, the method of FIG. 7 may be performed to calculate a class similarity score for nodes 251 and 261, a class similarity score for nodes 252 and 262, a class similarity score for nodes 253 and 263, etc. The method of FIG. 7 may be performed several times, once for each pair of matching nodes.

In the example of FIG. 7, a class represented by a node of an app class tree structure (also referred to herein as "app class") is compared against a class represented by a corresponding node of a matching SDK class tree structure (also referred to herein as "SDK class"). The detector 210 determines if the app class and the SDK class have the same derived-from class (step 401). For example, the detector 210 may determine if the app class and the SDK class have the same base class or the same super class. If the app class and the SDK class do not have the same base class or the same super class, the method of FIG. 7 is performed on the next following pair of classes, if any (step 402 to step 403).

If the app class and the SDK class have the same base class or the same super class, the detector 210 determines the similarity of the app class relative to the SDK class. In one embodiment, for performance reasons, the detector 210 determines the similarity of the app class relative to the SDK class in two steps. In a first step, the detector 210 calculates an initial per class similarity score, which does not take string tokens into account. The initial per class similarity score may be calculated as initial_per_class similarity=feature1*weight1+ feature2*weight2+ . . .

where feature1, feature2, etc. indicate a relevant class feature (but not string tokens) found in both the app class and the SDK class and weight1, weight2, etc. are weights that indicate the importance of a relevant class feature in identifying malicious apps. String tokens are not included in the calculation of the initial per class similarity score. An initial per class similarity score that is less than a threshold indicates that the app class is not similar enough to the SDK class. In that case, the app class and the SDK class are not included in the subsequent weighted similarity matching (step 404 to step 402).

Otherwise, when the initial per class similarity score is greater than the threshold, the detector 210 identifies string tokens that are common in both the app class and the SDK class. In one embodiment, the common string tokens are identified by fuzzy matching. A string token may be hashed prior to matching. In one embodiment, the algorithm used to hash a string token is selected based on the length of the string token. For example, a string token may be hashed using TLSH (Trend Micro Locality Sensitive Hash) when the length of the string token is greater than or equal to 256 and using Levenshtein distance when the string token is less than 256. Other hashing algorithms suitable for fuzzy matching may also be employed without detracting from the merits of the present invention.

The per class similarity score of the app class relative to the SDK may be calculated as in the initial per class similarity score except that the common string tokens (identified by fuzzy matching above) are now included in the calculation (step 405). More particularly, the per class similarity score of the app class, which is relative to the SDK class, may be calculated as per_class similarity=feature1*weight1+ feature2*weight2+ . . . feature_1*weight_1+ feature_2*weight_2+ . . .

where feature1, feature2, etc. indicate a relevant class feature found in both the app class and the SDK class, weight1, weight2, etc. are weights that indicate the importance of a relevant class feature in identifying malicious apps, feature_1, feature_2, etc. indicate a string token found in both the app class and the SDK class, and weight_1, weight_2, etc. are weights that indicate the importance of the string token in identifying malicious apps. In one embodiment, the detector 210 includes the name and the per class similarity score of the app class in a result list (step 406).

Continuing the example of FIG. 3, the weighted similarity matching of the classes of the app class tree structure and the matching SDK class tree structure may involve calculating an overall similarity score, which indicates the similarity of the classes of the app class tree structure and the matching SDK class tree structure. In one embodiment, the overall similarity score may be calculated by adding up the per class similarity scores of the classes of the app class tree structure relative to the classes of the matching SDK class tree structure. More particularly, the overall similarity score of the classes of the app class tree structure relative to the classes of the matching SDK class tree structure may be calculated as overall_similarity=per_class_similarity1+per_ class_similarity2+ . . .

where per_class_similarity1 is the per class similarity score of a class represented by a node in the app class tree structure relative to a corresponding class represented by a node in the matching SDK class tree structure, per_class_similarity2 is the per class similarity score of another class represented by another node in the app class tree structure relative to a corresponding another class represented by another node in the matching SDK class tree structure, etc.

The detector 210 may generate an output, which is the result of the evaluation of the mobile app (arrow 311). For example, the detector 210 may output the name of the package of the mobile app, the malicious SDK that may have been used to create the mobile app, and the overall similarity score. Because the overall similarity score is indicative of the similarity of the app class tree structure of the mobile app relative to the matching SDK class tree structure of the malicious SDK, the overall similarity score may be used as a measure of whether or not the mobile app was created using the malicious SDK. The overall similarity score may be compared to a threshold to determine if the mobile app is malicious.

FIG. 8 shows example outputs of the malicious mobile app detector 210 in accordance with an embodiment of the present invention. In the example of FIG. 8, the first column indicates the name of a malicious SDK, the second column indicates the package name of a mobile app that may have been created using the malicious SDK, and the third column indicates the overall similarity score of the mobile app. In the example of FIG. 8, an overall similarity score of "1" indicates that the mobile app was created using the malicious SDK, an overall similarity score of "0.902291" indicates that there is a 90.2291% chance that the mobile app was created using the malicious SDK etc. The example of FIG. 8 shows different mobile apps (see different package names) created using the "PUA:Waps" SDK, which is known to be malicious.

FIG. 9 shows results of tests in which embodiments of the present invention were employed to detect malicious mobile apps. In the example of FIG. 9, the row "AV-Test Vol." indicates the volume number of the test, "Sample Count" indicates the number of malicious mobile apps in the test, and "Detection Count" indicates the number of the malicious mobile apps that were correctly detected as being malicious. In the example of FIG. 9, the malicious mobile apps were created using a known malicious SDK and consequently includes classes of the malicious SDK. Advantageously, as shown in FIG. 9, embodiments of the present invention can achieve between 90 percent to 100 percent detection rate.

Methods and systems for detecting malicious mobile apps have been disclosed. While specific embodiments of the present invention have been provided, it is to be understood that these embodiments are for illustration purposes and not limiting. For example, although embodiments of the present invention are explained in the context of the ANDROID mobile operating system, embodiments of the present invention may also be applied to other mobile operating systems. Furthermore, many additional embodiments will be apparent to persons of ordinary skill in the art reading this disclosure.

What is claimed is:

1. A computer-implemented method comprising:
   creating a plurality of software development kit (SDK) class tree structures of a plurality of malicious SDKs, the SDK class tree structures comprising a plurality of nodes that each represents a class of a corresponding malicious SDK and indicates a class feature of the corresponding malicious SDK that is used in execution of a target mobile app created or repackaged using the corresponding malicious SDK;
   receiving a mobile app;
   creating an app class tree structure of the mobile app, the app class tree structure comprising a plurality of nodes that each represents a class of the mobile app and indicates a class feature of the mobile app that is used in execution of the mobile app;
   comparing the app class tree structure against the plurality of SDK class tree structures to find an SDK class tree structure that matches the app class tree structure;
   detecting that the mobile app has been created or repackaged using at least one of the plurality of malicious SDKs based on comparing the app class tree structure against the plurality of SDK class tree structures; and
   performing a security action in response to detecting that the mobile app has been created or repackaged using the at least one of the plurality of malicious SDKs.

2. The computer-implemented method of claim 1, wherein the mobile app is received from a smartphone.

3. The computer-implemented method of claim 1, wherein the mobile app is received from a third-party mobile app marketplace.

4. The computer-implemented method of claim 1, further comprising:
   determining similarity of classes of the app class tree structure relative to classes of the SDK class tree structure that matches the app class tree structure.

5. The computer-implemented method of claim 4, wherein the similarity is determined by weighted similarity matching.

6. A computer system comprising:
   a processor; and
   a memory, the memory comprising instructions that when executed by the processor causes the computer system to perform the steps of:
   receiving a mobile app;
   creating an app class tree structure of the mobile app, the app class tree structure representing a hierarchical tree structure of classes of the mobile app, the app class tree structure comprising a plurality of nodes that each represents a class of the mobile app and indicates a class feature of the mobile app that is employed in execution of the mobile app;
   comparing the app class tree structure of the mobile app to a software development kit (SDK) class tree structure of a malicious SDK, the SDK class tree structure representing a hierarchical tree structure of classes of the malicious SDK, the SDK class tree structure comprising a plurality of nodes that each represents a class of the malicious SDK and indicates a class feature of the malicious SDK that is employed in execution of a target mobile app created or repackaged using the malicious SDK;
   detecting that the mobile app is a malicious mobile app that has been created or repackaged using the malicious SDK when the app class tree structure matches the SDK class tree structure; and
   performing a security action in response to detecting that the mobile app has been created or repackaged using the malicious SDK.

7. The computer system of claim 6, wherein the computer system receives the mobile app from a third-party mobile app marketplace.

8. The computer system of claim 6, wherein the instructions, when executed by the processor, causes the computer system to further perform the step of:
   determining similarity of an app class represented as a node in the app class tree structure relative to an SDK class represented as a node in the SDK class tree structure.

9. The computer system of claim 8, wherein the computer system determines the similarity of the app class relative to the SDK class by weighted similarity matching.

10. The computer system of claim 6, wherein the computer system receives the mobile app over the Internet.

11. The computer system of claim 6, wherein the computer system receives the mobile app from a mobile computing device.

12. The computer system of claim 11, wherein the mobile computing device is a smartphone.

* * * * *